United States Patent
Evans

(10) Patent No.: US 11,468,359 B2
(45) Date of Patent: Oct. 11, 2022

(54) STORAGE DEVICE FAILURE POLICIES

(71) Applicant: Hewlett Packard Enterprise Development LP, Houston, TX (US)

(72) Inventor: Thomas David Evans, Bellevue, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1020 days.

(21) Appl. No.: 16/096,983

(22) PCT Filed: Apr. 29, 2016

(86) PCT No.: PCT/US2016/029930
§ 371 (c)(1),
(2) Date: Oct. 26, 2018

(87) PCT Pub. No.: WO2017/188968
PCT Pub. Date: Nov. 2, 2017

(65) Prior Publication Data
US 2019/0114559 A1    Apr. 18, 2019

(51) Int. Cl.
*G06N 20/00*    (2019.01)
*G06F 11/07*    (2006.01)
(Continued)

(52) U.S. Cl.
CPC ........... *G06N 20/00* (2019.01); *G06F 11/004* (2013.01); *G06F 11/0727* (2013.01);
(Continued)

(58) Field of Classification Search
None
See application file for complete search history.

(56) References Cited

U.S. PATENT DOCUMENTS

| 7,293,004 B1 | 11/2007 | Vengerov |
| 7,694,188 B2 | 4/2010 | Raghuraman et al. |

(Continued)

FOREIGN PATENT DOCUMENTS

| CN | 104281143 A | 1/2015 |
| EP | 3278224 A1 | 2/2018 |

(Continued)

OTHER PUBLICATIONS

Samsung, SSD Whitepaper, chapt. 7, available at The Wayback Machine—https://web.archive.org/web/20150310051031/http://www.samsung.com:80/global/business/semiconductor/minisite/SSD/global/html/whitepaper/whitepaper07.html, accessed Dec. 16, 2021, published 2015 or earlier, 3 pages. (Year: 2015).*

(Continued)

*Primary Examiner* — Vincent Gonzales
(74) *Attorney, Agent, or Firm* — Trop, Pruner & Hu, P.C.

(57) ABSTRACT

Example implementations relate to a failure policy. For example, in an implementation, storage device status data is encoded into storage device states. An action is chosen based on the storage device state according to a failure policy, where the failure policy prescribes, based on a probabilistic model, whether for a particular storage device state a corresponding action is to take no action or to initiate a failure mitigation procedure on a storage device. The failure policy is rewarded according to a timeliness of choosing to initiate the failure mitigation procedure relative to a failure of the storage device.

20 Claims, 6 Drawing Sheets

(51) Int. Cl.

| | |
|---|---|
| *G06F 11/00* | (2006.01) |
| *G06F 11/30* | (2006.01) |
| *G06N 3/00* | (2006.01) |
| *G06F 11/22* | (2006.01) |
| *G06F 11/20* | (2006.01) |

(52) U.S. Cl.
CPC ...... *G06F 11/0784* (2013.01); *G06F 11/2257* (2013.01); *G06F 11/3034* (2013.01); *G06N 3/006* (2013.01); *G06F 11/2094* (2013.01)

(56) References Cited

U.S. PATENT DOCUMENTS

| | | | |
|---|---|---|---|
| 7,707,461 | B2 | 4/2010 | Dougherty et al. |
| 7,730,364 | B2 | 6/2010 | Chang et al. |
| 8,429,097 | B1 | 4/2013 | Sivasubramanian et al. |
| 8,874,494 | B1 | 10/2014 | Evans |
| 9,189,309 | B1 | 11/2015 | Ma et al. |
| 9,244,790 | B1 | 1/2016 | Ma |
| 2007/0079170 | A1 | 4/2007 | Zimmer et al. |
| 2007/0203871 | A1* | 8/2007 | Tesauro ............... G06N 3/006 706/53 |
| 2008/0189578 | A1 | 8/2008 | Raghuraman et al. |
| 2015/0046756 | A1 | 2/2015 | Sreekumaran et al. |

FOREIGN PATENT DOCUMENTS

| | | |
|---|---|---|
| WO | WO-2014043623 A1 | 3/2014 |
| WO | 2017/188968 A1 | 11/2017 |

OTHER PUBLICATIONS

Weyns D, Schmerl B, Grassi V, Malek S, Mirandola R, Prehofer C, Wuttke J, Andersson J, Giese H, Göschka KM. On patterns for decentralized control in self-adaptive systems. In Software Engineering for Self-Adaptive Systems II 2013 (pp. 76-107). Springer, Berlin, Heidelberg. (Year: 2013).*

Kaelbling LP, Littman ML, Moore AW. Reinforcement learning: A survey. Journal of artificial intelligence research. May 1, 1996;4:237-85. (Year: 1996).*

Perumal S, Kritzinger P. A tutorial on RAID storage systems. University of Cape Town, Department of Computer Science report CS04-05-00. 23 pages. 2004. (Year: 2004).*

Extended European Search Report received in EP Application No. 16895740.5, dated Jan. 7, 2019, 9 pages.

Sutton, R. S., "Dyna, an integrated architecture for learning, planning, and reacting," Jul. 1, 1991, pp. 160-163, http://citeseerx.ist.psu.edu/viewdoc/download?doi=10.1.1.329.6065&rep=rep1&type=pdf.

Agrawal, V. et al., "Prediction of Hard Drive Failures via Rule Discovery From Autosupport Data," (Research Paper), Nov. 14, 2009, 15 pages, available at http://mllab.csa.iisc.ernet.in/html/pubs/disk-failure-prediction-natj.pdf.

International Search Report & Written Opinion received in PCT/US2016/029930, dated Feb. 15, 2017, 8 pages.

Sutton et al., "Actor-Critic Methods," Reinforcement Learning: An Introduction, section 6.6, available online at <https://web.archive.org/web/20160305013059/http://webdocs.cs.ualberta.ca/~sutton/book/ebook/node66.html>, Mar. 5, 2016, pp. 1-3.

Sutton et al., "The Agent-Environment Interface," Reinforcement Learning: An Introduction, section 3.1, available online at <https://web.archive.org/web/20160305011925/http://webdocs.cs.ualberta.ca/~sutton/book/ebook/node28.html>, Mar. 5, 2016, pp. 1-3.

Sutton et al., "Value Functions," Reinforcement Learning: An Introduction, section 3.7, available online at <https://web.archive.org/web/20160305012012/http://webdocs.cs.ualberta.ca/~sutton/book/ebook/node34.html>, Mar. 5, 2016, pp. 1-6.

Wikipedia, "Key Code Qualifier," available online at <https://en.wikipedia.org/w/index.php?title=Key_Code_Qualifier&oldid=709405591>, Mar. 10, 2016, pp. 1-7.

Agrawal, V. et al., "Prediction of Hard Drive Failures via Rule Discovery From Autosupport Data," (Research Paper), Nov. 14, 2009, 15 pages, <http://mllab.csa.iisc.ernet.in/html/pubs/disk-failure-prediction-natj.pdf>.

Karan M. Gupta, "Performance Comparison of Sarsa(lambda) and Watkin's Q(lambda) Algorithms," available May 29, 2014, <https://web.archive.org/web/20140529010828/http://www.karanmg.net/Computers/reinforcementLearning/finalProject/KaranComparisonOfSarsaWatkins.pdf>.

Mann, S.E. et al., "On the Reliability of Raid Systems: an Argument for More Check Drives," (Research Paper), Feb. 16, 2012, 13 pages, available at http://arxiv.org/pdf/1202.4423.pdf.

Wikipedia, "S.M.A.R.T.," Mar. 28, 2016, <https://en.wikipedia.org/w/index.php?title=S.M.A.R.T.&oldid=712319114>.

Wikipedia, "State-action-reward-state-action," Nov. 18, 2015, <https://en.wikipedia.org/w/index.php?title=State%E2%80%93action%E2%80%93reward%E2%80%93state%E2% 80%93action&oldid=691186070>.

* cited by examiner

STORAGE DEVICE FAILURE POLICIES

BACKGROUND

Storage devices, such as hard disk drives or solid state drives, may be implemented in a storage array in a RAID (Redundant Array of Independent Disks) configuration. Storage devices may fail unexpectedly. Failure of multiple storage devices at or around the same time may break a RAID set.

BRIEF DESCRIPTION OF THE DRAWINGS

Various examples will be described below with reference to the following figures.

Figure 1:
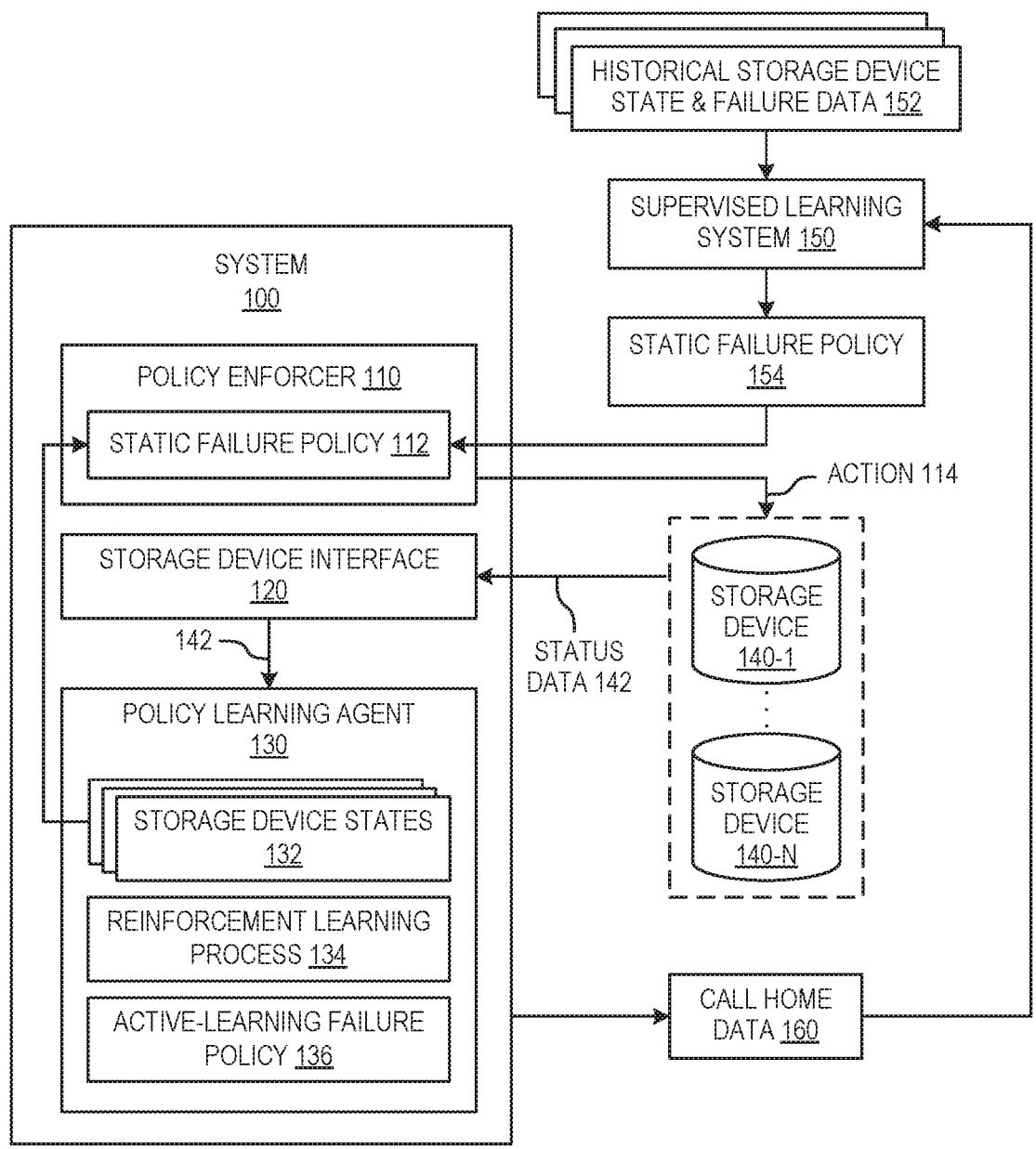
FIG. 1 is a block diagram that depicts an example system that implements a static failure policy and trains an active-learning failure policy on storage device states.

Throughout the drawings, identical reference numbers may designate similar, but not necessarily identical, elements. A hyphenated index number "N" appended to some of the reference numerals may be understood to merely denote plurality and may not necessarily represent the same quantity for each reference numeral having such an index number "N". Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

Storage devices, such as hard disk drives or solid state drives, may be implemented in storage arrays or storage systems. Some storage arrays or storage systems may implement storage devices as a set in a RAID (Redundant Array of Independent Disks) configuration, such as RAID 5 or RAID 50.

Storage devices may fail unexpectedly. Storage device failure may be defined in some instances as the point at which a storage device reports a SMART (Self-Monitoring, Analysis and Reporting Technology) trip, that is, an error code or indicator reported by a SMART monitoring system included in the storage device. Although some RAID configurations may offer some protection against read errors or even failures of an entire storage device, failure of multiple storage devices at or about the same time may break a RAID set. Failure of multiple storage devices at about the same time in a same storage array or RAID set can occur for storage devices having the same capacity, speed, and type that are manufactured by the same vendor and in a same batch and are exposed to the same or similar workloads, cycle times, and environmental conditions (temperature, pressure, humidity, vibration, etc.).

To avoid problems associated with storage device failure, particularly concurrent failure of multiple storage devices, it may be useful to initiate a storage device failure mitigation procedure (including data migration to another storage device) and remove the storage device from service in advance of a SMART trip. However, removing the storage device too far in advance of failure may be costly, in terms of vendor or manufacturer warranty dollars for example.

Accordingly, it may be useful to provide a system that intelligently learns a storage device failure policy that anticipates imminent storage device failure and initiates a storage device failure mitigation procedure at an appropriate time in advance of actual storage device failure. For example, an appropriate time may mean with sufficient time to complete data migration from the failing storage device to another storage device.

Examples disclosed herein may relate to, among other things, training an active-learning failure policy. In some implementations, a system collects status data from a storage device and encodes the collected status data into storage device states. The system may apply a reinforcement learning process to train an active-learning failure policy on the storage device states. The active-learning failure policy may contain state-action pairs each pair being based on a probability of choosing an action from a set of actions for a given storage device state, where the set of actions include initiating a failure mitigation procedure on the storage device or to taking no action. In particular, the reinforcement learning process over time may monitor what actions the active-learning failure policy chooses in response to the encoded storage device states, and may reward the active-learning failure policy according to a timeliness of choosing to initiating the failure mitigation procedure relative to a failure of the storage device.

Referring now to the figures, FIG. 1 is a block diagram that depicts an example system 100 that implements a static failure policy and trains an active-learning failure policy on storage device states. The term "static" denotes that the static failure policy remains stable or unchanged by the system 100, while the term "active-learning" denotes that the active-learning failure policy may be adjusted by the system 100, via unsupervised machine learning for example. The system 100 includes a policy enforcer 110, a storage device interface 120, and a policy learning agent 130, each of which may be hardware devices (e.g., electronic circuitry or logic) or any combination of hardware and programming to implement their respective functionalities described herein. For example, programming may include executable instructions stored on a non-transitory machine readable medium, such as random access memory (RAM), read-only memory (ROM), electrically erasable programmable read-only memory (EEPROM), flash memory, a hard disk drive, etc. Hardware may include a processing resource, such as a microcontroller, a microprocessor, central processing unit (CPU) core(s), application-specific integrated circuit (ASIC), a field programmable gate array (FPGA), and/or other hardware device suitable for retrieval and/or execution of instructions from the machine readable medium.

The system 100 may be in communication with at least one storage device, such as one or more of the plurality of storage devices 140-1 through 140-N (referred to in general as storage devices 140 collectively or as a storage device 140 individually). For example, the storage device interface 120 may provide for communications between the system 100 and the storage devices 140 according to the SCSI standard, although other communications protocols may be utilized. Each of the storage devices 140 may include, for example, a solid state drive (SSD), a hard disk drive (HDD), a tape drive, persistent memory, or a device based on other storage medium.

In some implementations, the system 100 may serve as or form part of a storage controller of a storage system, and the storage devices 140 may serve as or form part of storage capacity of that storage system. In some implementations, the system 100 and the storage devices 140 may be integrated together in a same storage system and/or in a same enclosure. In operation, a host system (not shown), such as a server, a workstation, a desktop computer, a laptop computer, a mobile/portable device, etc., may issue data access (read and/or write) requests intended for a storage device 140, and such requests may be handled or processed by the system 100.

The system 100 also may be in communication with a supervised learning system 150, via any wired and/or wireless communications technology and over a network (e.g., the Internet, an intranet, a Wide Area Network, a Local Area Network, a Campus Area Network, a Storage Area Network, a wireless network, a cellular communications network, etc.). The supervised learning system 150 may be a computing system, such as a server, a workstation, a desktop computer, a laptop computer, etc. In some examples, the supervised learning system 150 may be deemed an external server with respect to the system 100. The supervised learning system 150 may utilize a database of historical storage device state and failure data 152 (also referred to herein as historical data 152 for convenience) as a training data set to generate a static failure policy 154. As will be described below, the system 100 may implement the static failure policy 154 to anticipate or predict failure of the storage devices 140 and attempt to mitigate such predicted failure.

For example, the historical data 152 may relate to storage devices that have failed (e.g., SMART tripped, actual failure, or user-failed) and have been returned from service for analysis (e.g., by the storage device vendor or manufacturer). Historical data 152 may include status data about each of the failed storage devices from various points in time prior to failure, where status data may include SCSI mode pages, Key Code Qualifiers, or the like. More particularly, the status data may include, for each failed storage device, information such as vendor and model, power-on hours, number of hard read errors, number of soft read errors, number of hard write errors, number of soft write errors, number of command timeouts, number of blocks written, number of blocks read, and/or other storage device diagnostic data. The status data of failed drives may have been sent to the supervised learning system 150 as call home data (e.g., over a network, such as the Internet) and/or may be stored on the failed drives. The historical data 152 also may include state space representations of the status data (also referred to as storage device states). Status data and/or state space representations are functions of time, and may be thus related in time to the failure of the storage device.

The supervised learning system 150 may derive the static failure policy 154 using historical data of storage device states for known storage device failures (historical data 152). For example, the supervised learning system 150 may process the historical data 152 using a probabilistic model to derive a static failure policy 154 that would initiate a failure mitigation procedure, in view of storage device states in the historical data 152, as close as possible to but no later than a predetermined time period prior to failure of that storage device. For example, the predetermined time period may be at least the time duration to perform the failure mitigation procedure (e.g., a sufficient amount of time to migrate data off of failing storage devices). In some cases, the predetermined time period may be a period of approximately twenty-four (24) hours (where approximately may include a margin of +/− one hour, for example). The predetermined time period may be proportional to the capacity of the storage devices by virtue of the additional time to fully migrate a higher capacity storage device.

The static failure policy 154 may include state-action pairs, that is, for any given storage device state, the policy 154 dictates an action. More particularly, the action may be to take no action (e.g., a no operation, an idle task, etc.) or to initiate the failure mitigation procedure. In some implementations, additional actions may be included as possibilities of a state-action pair. Underlying each state-action pair is a probability of taking an action while in a given state. In some implementations, the action with the highest probability is assigned to the state in the pair (e.g., >50% probability, in an implementation with two possible actions).

The system 100, or the policy enforcer 110 in particular, may receive static failure policy 154 from an external server, such as the supervised learning system 150. For example, the policy enforcer 110 may retrieve the static failure policy 154 or the supervised learning system 150 may send or push the static failure policy 154. The system 100 may store the static failure policy 154 as static failure policy 112, in the non-transitory machine readable medium described above, in storage, in memory, or the like. Additionally, the system 100, or the policy learning agent 130 in particular, may initialize the active-learning failure policy 136 to the static failure policy 112. That is, the state-action pairs and the underlying probabilistic model of the active-learning failure policy 135 start off as copies of those of the static failure policy 112.

The storage device interface 120 collects status data 142 from the storage devices 140. For example, as described above, the storage device interface 120 may operate according to a SCSI standard, in which case, status data 142 may include SCSI mode pages, Key Code Qualifiers, or the like. More particularly, the status data 142 may include information such as vendor and model, power-on hours, number of hard read errors, number of soft read errors, number of hard write errors, number of soft write errors, number of command timeouts, number of blocks written, number of blocks read, and/or other storage device diagnostic data.

The policy learning agent 130 may encode the collected status data 142 into storage device states 132. Storage device states 132 may be associated with a particular storage device 140 and a particular point in time. Because status data 142 may be collected over time, plural storage device states 132 may represent states of the storage devices 140 over time. In some implementations, to encode the storage device states 132, the policy learning agent 130 may apply tile coding to reduce or discretize the state space in which the status data 142 exists, which may improve efficiency of the policy learning agent 130 to derive an active-learning failure policy 136.

The encoded storage device states 132 may be utilized by the policy enforcer 110 and the policy learning agent 130 in parallel. The policy enforcer 110 may implement the static failure policy 112 on at least one of the storage devices 140 using corresponding storage device states 132 encoded from collected status data 142, while the policy learning agent 130 simulates implementation of the active-learning failure policy 136 on at least one of the storage devices 140 using corresponding storage device states 132 to perform machine learning on the policy 136. As described above, the active-learning failure policy 136 may be initialized to be the same as the static failure policy 112, but the active-learning failure policy 136 may be adjusted or altered by the policy learning agent 130 based on new information while the static failure policy 112 is not modified by the system 100, whether by the policy enforcer 110 or the policy learning agent 130, so as to provide predictable level of service to users of the storage devices 140.

With respect to the policy enforcer 110, the policy enforcer 110 may take as input a storage device state 132 for a storage device 140 at a present time "t", determine a corresponding action for that storage device state 132 according to the state-action pair of the static failure policy 112, and perform that action (depicted as 114) on the storage device 140. As described above with respect to static failure policy 154, possible actions may include taking no action or initiating a failure mitigation procedure.

The failure mitigation procedure may be controlled by or included in the policy enforcer 110 or another aspect of the system 100 outside of the policy enforcer 110 (e.g., additional programming implemented by a programming resource of the system 100). In some implementations, a failure mitigation procedure so initiated by an action 114 for a particular storage device 140 includes diverting data access requests from that particular storage device 140 and migrating data from that particular storage device 140 to a different, non-failing storage device 140.

Upon completion of data migration, the failure mitigation procedure may shut down the particular storage device 140. Alternatively, the failure mitigation procedure may keep the particular storage device 140 alive, which may include running a reference pattern over the storage device 140, so that the policy learning agent 130 may collect additional data to train the active-learning failure policy 136. In some implementations, the particular storage device 140 may be kept alive after initiating the failure mitigation procedure for the predetermined time period, until the particular storage device 140 SMART trips, or other conditions.

With respect to the policy learning agent 130, the policy learning agent 130 applies a reinforcement learning process 134 to train the active-learning failure policy 136 on the storage device states 132 (i.e., states 132 over different time periods for each storage device 140). Similar to the static failure policy 112, the active-learning failure policy 136 contains state-action pairs that relate, for a given storage device state, a probability of choosing an action from a set of actions. As with the static failure policy 112, the set of actions include at least initiating the failure mitigation procedure on a storage device 140 or taking no action.

The policy learning agent 130, executing the reinforcement learning process 134, monitors what actions (i.e., simulated actions) the active-learning failure policy 130 chooses in response to the storage device states, for each storage device 140 and over time. The policy learning agent 130, executing the reinforcement learning process 134, also monitors for failures of the storage devices 140, where failure may defined for example as the occurrence of a SMART trip reported by the storage device 140.

The policy learning agent 130, executing the reinforcement learning process 134, assigns a reward to the active-learning failure policy 130 according to a timeliness of choosing to initiate the failure mitigation procedure on a particular storage device 140 relative to the time of failure of that storage device 140. For example, the reinforcement learning process 134 may utilize $Q(\lambda)$, $TD(\lambda)$ (TD being an acronym for Temporal Difference), $SARSA(\lambda)$ (SARSA being an acronym for State-Action-Reward-State-Action), or other like procedures encoded into machine readable instructions.

A formulation of the reinforcement learning process 134 for adjusting the active-learning failure policy 130 will now be described. Let "$s_t$" represent a storage device state 132 of a storage device 140 at a time t, "$a_t$" represent an action taken in response to $s_t$ (i.e., either no action or initiating a failure mitigation procedure), and "(s,a)" represent the state-action pair.

Each state-action pair has a value "Q(s,a)", which represents an expected reward for taking an action a in a given state s in accordance with the active-learning failure policy 130. Mathematically, Q(s,a) is provided by the following equation:

$$Q_{t+1}(s,a) = Q_t(s,a) + \alpha \delta_t e_t(s,a), \text{ for all } s,a$$

In the above equation for Q(s,a), an error "δ" (delta) drives learning, and is defined by the equation:

$$\delta_t = r_{t+1} + \gamma Q_t(s_{t+1}, a_{t+1}) - Q_t(s_t, a_t)$$

Figure 2:
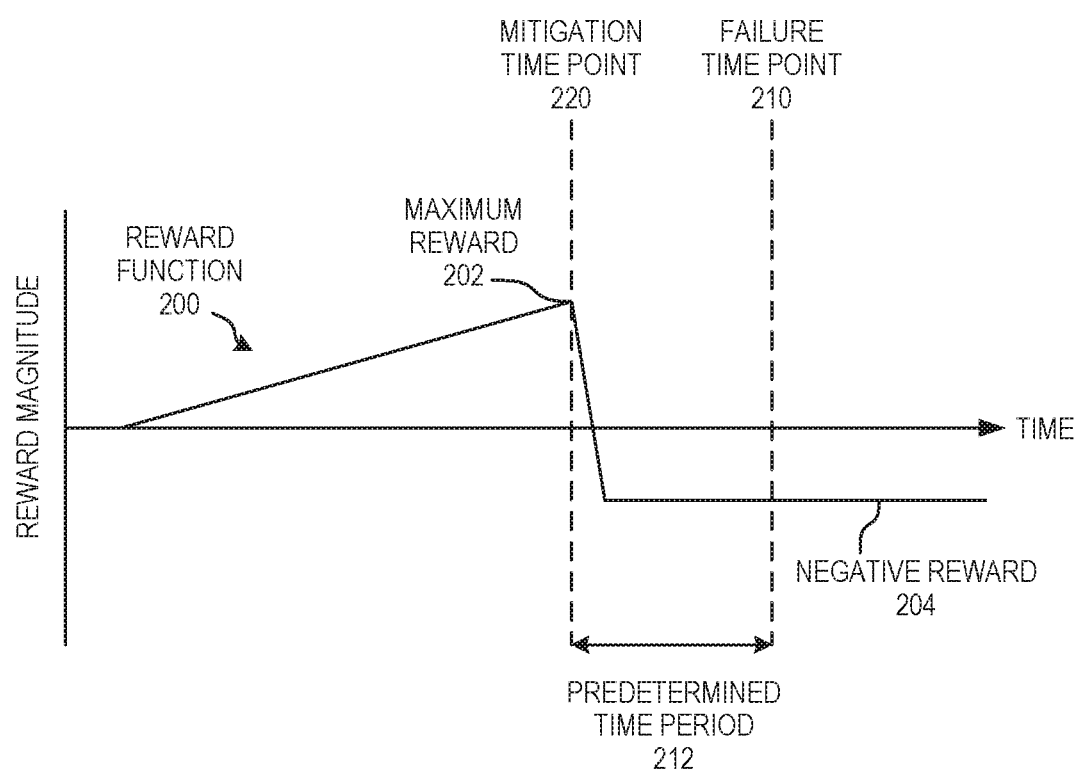
FIG. 2 depicts an example time-based reward function related to initiating a failure mitigation policy.

A reward value "r" may be assigned a value proportional, at least in part, to the time between taking an action a and future failure of the storage device 140. To illustrate, FIG. 2 depicts but one example of a time-based reward function 200 for taking an action a to initiate a failure mitigation policy, with reference to a failure time point 210 at which a storage device 140 fails. A mitigation time point 220 precedes the failure time point 210 by a predetermined time period 212, such as twenty-four hours or a sufficient time to migrate data off of the failing storage device 140. A maximum value of r (202 on FIG. 2) may be assigned when an action a is to initiate the failure mitigation procedure on the storage device 140 at a predetermined time period prior to failure of the storage device 140. In other words, the reinforcement learning process 134 rewards the active-learning failure policy 136 with a maximum reward for choosing to initiate the failure mitigation procedure on the storage device 140 a predetermined time period prior to failure of the storage device 140. In some implementations, lower reward values may be assigned to r for initiating the failure mitigation procedure early, prior to the mitigation time point 220.

Negative rewards, also referred to as punishments, may be assigned to discourage an action. For example, a negative value of r (204 on FIG. 2) may be assigned if the failure mitigation procedure is initiated after the failure time point 210, and in some cases, after the mitigation time point 220. In other words, the reinforcement learning process may reward the active-learning failure policy 138 with a punishment for not choosing to initiate the failure mitigation procedure on the storage device 140 the predetermined time period prior to failure of the storage device 140. In some implementations, a negative reward value may be assigned for taking an action a to initiate the failure mitigation procedure on a storage device 140 that does not experience a failure. A negative reward value may also be assigned to taking an action a that is no action, and the storage device 140 subsequently fails.

Various parameters may be adjusted to tune the performance of the reinforcement learning process 134. A learning factor "α" (alpha) is configurable in a range of $0 \leq \alpha \leq 1$ to prescribe to what extent new information, resulting from a single action, overrides old information. A higher α factor enables the reinforcement learning process 134 to respond more quickly to new information. A discount factor "γ" (gamma) factor, in the λ equation, is configurable in a range of $0 \leq \lambda \leq 1$ to prescribe the importance of future rewards. A discount rate of one favors future rewards, and a discount rate of zero considers only current rewards.

An eligibility trace "$e_t(s,a)$" is associated with each state-action pair. The policy learning agent 130 may utilize eligibility traces to track the occurrence of state-action pairs. Each time a particular storage device state s is encoded and the corresponding action a is taken according to the active-learning failure policy 136, an eligibility trace for that state-action pair is incremented. Mathematically stated:

$$e_t(s,a) = \gamma \lambda e_{t-1}(s,a) + 1, \text{ if } s = s_t \text{ and } a = a_t$$

$$e_t(s,a) = \gamma \lambda e_{t-1}(s,a), \text{otherwise}.$$

Eligibility traces decay over time at a rate of $\gamma \lambda A$, using $\gamma$ as described above and a trace decay "$\lambda$" (lambda) configurable in the range of $0 \leq \lambda \leq 1$ (e.g., 0.9) depending on how much weight is to be given to more recent state transactions.

Over time and across multiple ones (e.g., all) of storage devices 140-1 through 140-N, the policy learning agent 130 repeats execution of the reinforcement learning process 134, which observes a storage device state, selects a corresponding action based on state-action pairs of the active-learning failure policy 136, observes subsequent storage device states, and rewards the policy, thus updating the Q(s,a) values. Over multiple iterations, the Q(s,a) values may indicate that a particular action tends to be selected most often for a given state. For example, if $a_0$ represents taking no action and $a_1$ represents the action of initiating the failure mitigation procedure, for a given storage device states (132), the probability of taking no action may be given by $Q(s, a_0)/(Q(s,a_0)+Q(s,a_1))$ and the probability of initiating the failure mitigation procedure may be given by $Q(s,a_1)/(Q(s,a_0)+Q(s,a_1))$. Such probabilities of performing a particular action may be encoded into the active-learning failure policy 136 at each storage device state s (providing that that state has been observed or explored) by various techniques, such as selecting the action that has the greatest probability. Thus, by virtue of the foregoing, the policy learning agent 130 may continually fine tune and optimize the active-learning failure policy 136 to prepare for storage device failure a predetermined time period preceding failure of storage devices.

Referring back to FIG. 1, the system 100 may send call home data 160 to the supervised learning system 150. Call home data 160 may include, for example, status data 142, storage device states 132, the active-learning failure policy 136 (including Q(s,a) values, encoded state-action pairs, etc.), failure data related to storage devices 140 (e.g., time of SMART trip, SMART trip codes). The system 100 may send the call home data 160 on occasion, such as on a periodic basis, upon predefined conditions (e.g., the active-learning failure policy 136 diverging from the static failure policy 112), upon request, etc. The supervised learning system 150 may include the call home data 160 into the historical storage device state and failure data 152. The supervised learning system 150 may analyze an active-learning failure policy 136, as well as the storage device states 132 and storage device 140 failure data, to improve the static failure policy 154.

Figure 3:
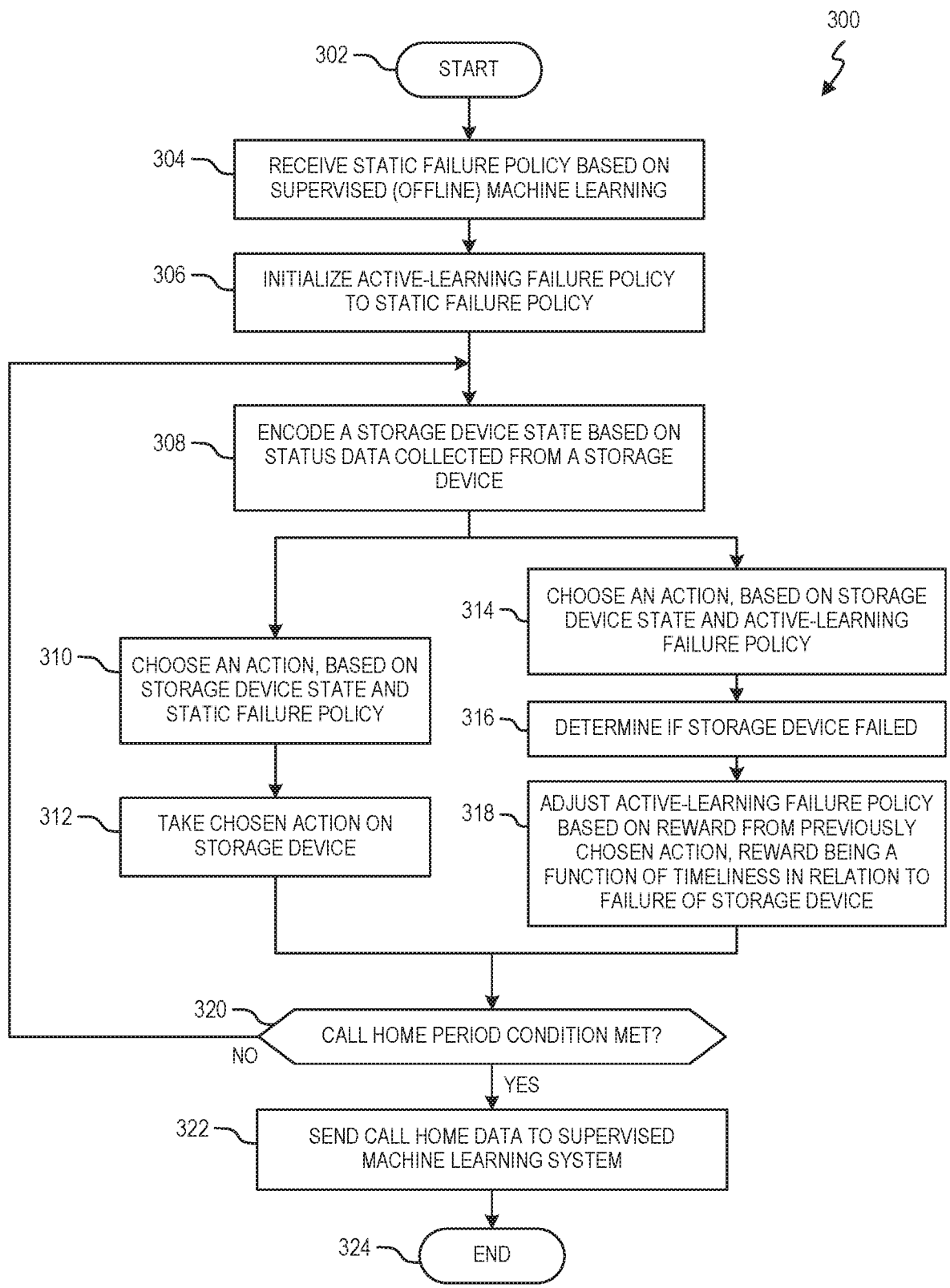
FIG. 3 is a flow diagram depicting an example method for learning a failure policy.

FIG. 3 is a flow diagram depicting an example method 300 for learning a failure policy. Method 300 may be implemented in the form of executable instructions stored on a machine readable medium and executed by a processing resource (e.g., a microcontroller, a microprocessor, central processing unit core(s), an ASIC, a FPGA, etc.) and/or in the form of electronic circuitry. For example, method 300 may be performed by a storage system, of which the system 100, and more particularly, the policy learning agent 130, may form a part. In some implementations of the present disclosure, one or more blocks of method 300 may be executed substantially concurrently or in a different order than shown in FIG. 3. In some implementations of the present disclosure, method 300 may include more or fewer blocks than are shown in FIG. 3. In some implementations, one or more of the blocks of method 300 may, at certain times, be ongoing and/or may repeat.

The method 300 may begin at block 302, and continue to block 304, where a storage system (e.g., 100) receives a static failure policy (e.g., 154) derived by a supervised machine learning system (e.g., 150) that applies supervised or offline machine learning to a historical data set of storage device states for known storage device failures. At block 306, the storage system initializes an active-learning failure policy (e.g., 136) to the static failure policy. For example, the active-learning failure policy may initially be a copy of the static failure policy. The static failure policy and the active-learning failure policy may each prescribe, based on a probabilistic model, whether for a particular storage device state a corresponding action is to wait for a next storage device state (i.e., take no action) or to initiate a failure mitigation procedure on the storage device, such as a data migration to another storage device.

At block 308, the storage system encodes a storage device state (e.g., 132) based on status data (e.g., 142) collected from a storage device (e.g., 140) coupled to or otherwise in communication with the storage system. For example, the status data may include a SCSI mode page or a Key Code Qualifier or the like. After block 308, blocks 310, 312 are performed in parallel with blocks 314, 316, 318.

At block 310, the storage system chooses, in accordance with the static failure policy, an action (e.g., wait or initiate failure mitigation procedure) based on the storage device state encoded at block 308. At block 312, the storage system performs the action chosen at block 310 on the storage device. After block 312, the method proceeds to block 320, however, blocks 314, 316, 318 will first be described.

At block 314, the storage system chooses an action (e.g., wait or initiate failure mitigation procedure) based on the storage device state encoded at block 308 and according to the active-learning failure policy. At block 316, the storage system determines if the storage device failed (e.g., a SMART trip reported by the storage device).

At block 318, the storage system adjusts the active-learning failure policy based on a reward resulting from a previously chosen action (e.g., a previous iteration of blocks 308, 314, 316, 318). In some implementations, adjusting the active-learning failure policy at block 318 may be performed according to $Q(\lambda)$, $TD(\lambda)$, $SARSA(\lambda)$, or a like technique. The magnitude of the reward may be a function (e.g., FIG. 2) of timeliness of the previously performed action in relation to a failure of the storage device determined by block 316. For example, in some implementations, the magnitude of the reward is a maximum positive if the previously chosen action is initiating the failure mitigation procedure and the storage device fails at a predetermined time period thereafter, such as a predetermined time period of twenty-four hours.

After blocks 312 and 318, method 300 proceeds to block 320, where the storage system determines whether a call home condition has been met, such as a scheduled time, a divergence between the active-learning failure policy and the static failure policy, or a request for call home data from an external server. If a call home condition has not been met ("NO" at block 320), method 300 returns to block 308. If a call home condition has been met "YES" at block 320), method 300 proceeds to block 322, where the storage system sends call home data (e.g., 160) associated with the active-learning failure policy to an external server (e.g., supervised learning system 150). The call home data also may include storage device states and storage device failure data utilized in adjusting the active-learning failure policy (e.g., at block 318). The call home data may be analyzed and compared to the static failure policy by the external server. In some implementations, the static failure policy may be adjusted or optimized based on the call home data, and the static failure policy in turn may be updated to the storage system (e.g., in a manner similar to block 304). The method may end at block 324. In some implementations, method 300 may be ongoing after block 322, by returning to block 308 for example.

Figure 4:
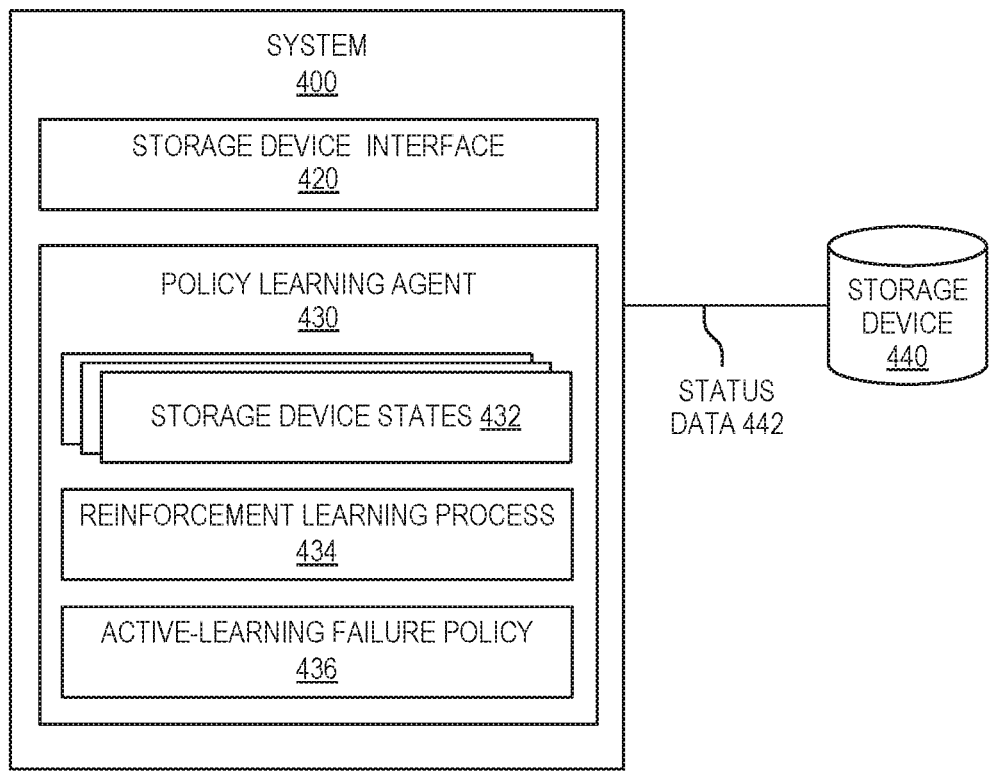
FIG. 4 is a block diagram that depicts an example system that applies a reinforcement learning process to train a failure policy on storage device states.

FIG. 4 is a block diagram that depicts an example system 400 that applies a reinforcement learning process to train a failure policy on storage device states. The system 400 includes a storage device interface 420 and a policy learning agent 430, each of which may be hardware devices (e.g., electronic circuitry or logic, processing resource) or any combination of hardware and programming to implement their respective functionalities described herein.

The system 400 may collect status data 442 from a storage device 440 via the storage device interface 420. For example, the storage device interface 420 may include a SCSI interface, and status data 442 may include a SCSI mode page or a Key Code Qualifier. Status data 442 may be time series data.

The policy learning agent 430 may encode collected status data 442 into storage device states 432. In some implementations, each time point of status data 442 may be encoded as a single storage device state 432. The policy learning agent 430 may apply a reinforcement learning process 434 (e.g., $Q(\lambda)$, $SARSA(\lambda)$, $TD(\lambda)$, etc.) to train an active-learning failure policy 436 on the storage device states 432. The active-learning failure policy 436 contains state-action pairs, each of which are based on a probability of choosing an action from a set of actions for a given storage device state 432, the set of actions including to initiate a failure mitigation procedure on the storage device 440 or to take no action (i.e., wait for a next state).

More particularly, the reinforcement learning process 434 monitors what actions the active-learning failure policy 436 chooses in response to the storage device states 432, and rewards the active-learning failure policy 436 according to a timeliness of choosing to initiating the failure mitigation procedure in response to a storage device state 432 relative to a subsequent failure of the storage device 440.

Figure 5:
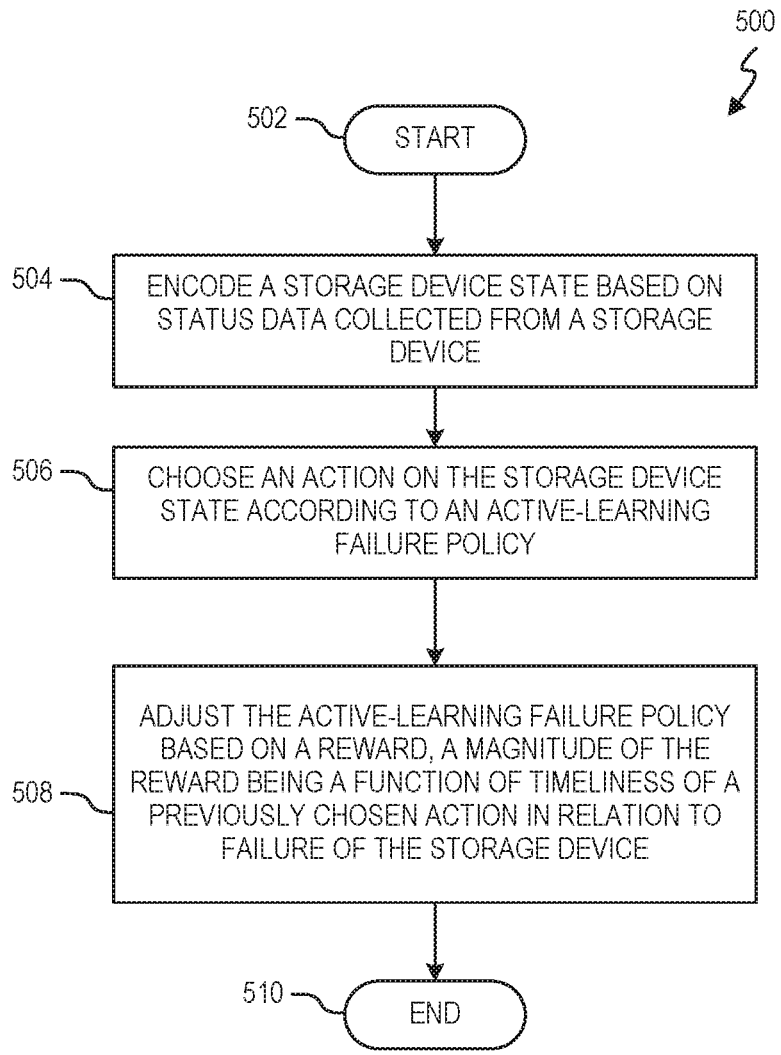
FIG. 5 is a flow diagram depicting an example method for learning a failure policy.

FIG. 5 is a flow diagram of an example method 500 for learning a failure policy. Like method 300, method 500 may be implemented in the form of executable instructions stored on a machine readable medium and executed by a processing resource (e.g., a microcontroller, a microprocessor, central processing unit core(s), an ASIC, a FPGA, etc.) and/or in the form of electronic circuitry. For example, method 500 may be performed by a storage system, of which the system 100 or 400, and more particularly, the policy learning agent 130 or 430, may form a part. In some implementations of the present disclosure, one or more blocks of method 500 may be executed substantially concurrently or in a different order than shown in FIG. 5. In some implementations of the present disclosure, method 500 may include more or fewer blocks than are shown in FIG. 5. In some implementations, one or more of the blocks of method 300 may, at certain times, be ongoing and/or may repeat.

Method 500 may begin at block 502 and continue to block 504, where a storage system encodes a storage device state based on status data collected from a storage device coupled to the storage system.

At block 506, the storage system chooses an action based on the storage device state encoded at block 502 and according to an active-learning failure policy. The active-learning failure policy may contain state-action pairs that prescribe, based on a probabilistic model, whether for a particular storage device state a corresponding action is to wait for a next storage device state or to initiate a failure mitigation procedure on the storage device.

At block 508, the storage system adjusts the active-learning failure policy based on a reward resulting from a previously chosen action, a magnitude of the reward being a function of timeliness of the previously chosen action in relation to a failure of the storage device. At block 510, method 500 may end.

Figure 6:
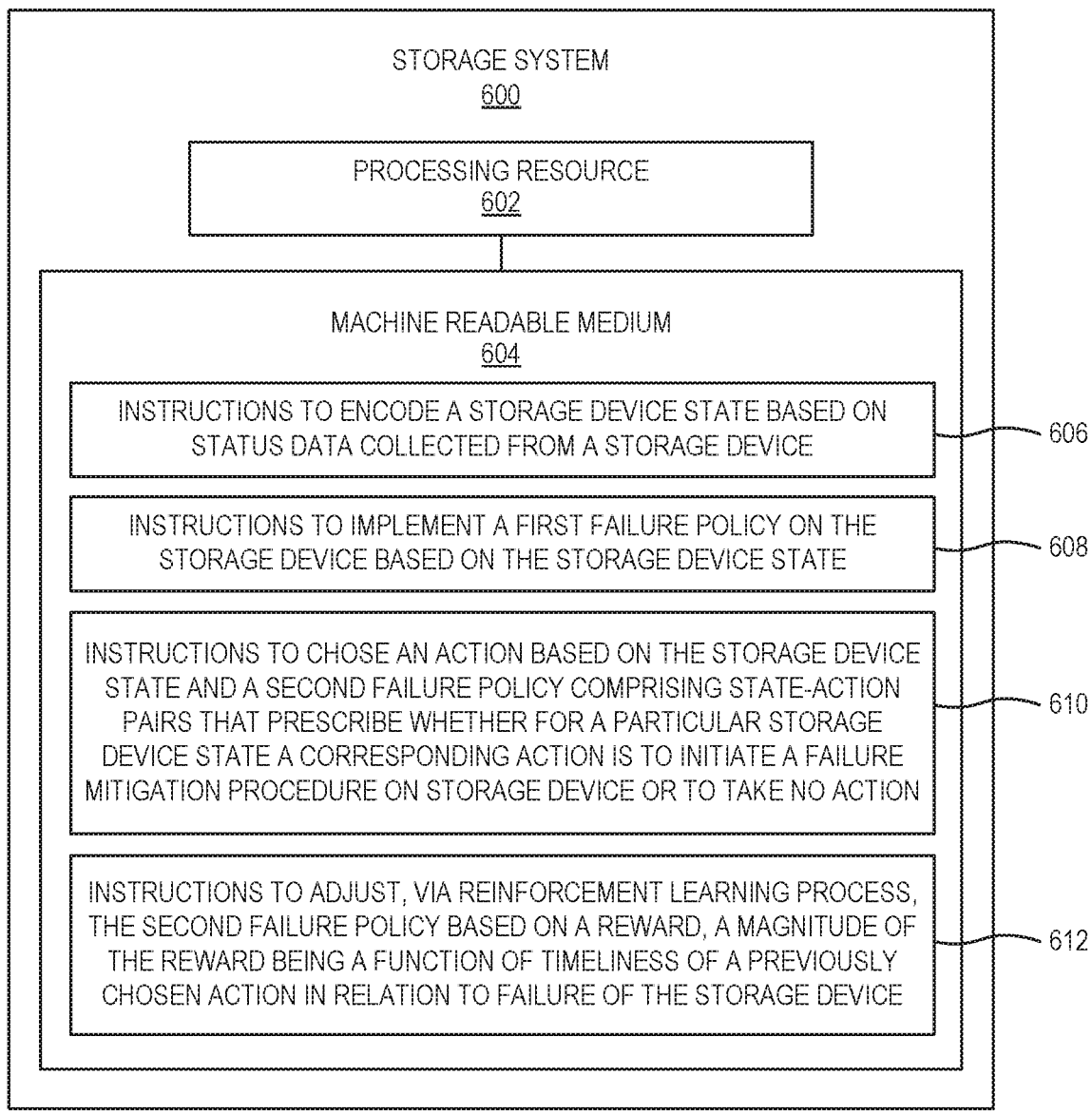
FIG. 6 is a block diagram of an example storage system that includes a non-transitory, machine readable medium encoded with example instructions to adjust a failure policy via a reinforcement learning process.

FIG. 6 is a block diagram of an example storage system 600 that includes at least one processing resource 602 coupled to a machine readable medium 604. The storage system 600 may be in communication with storage device(s) via a storage device interface (e.g., a SCSI interface). In some implementations, the storage system 600 may serve as or form part of the system 100 of FIG. 1 or the system 400 of FIG. 4. In particular, the processing resource 602 coupled to the machine readable medium 604 may serve as or form part of the policy learning agent 130 of FIG. 1 in some implementations.

The processing resource 602 may include a microcontroller, a microprocessor, central processing unit core(s), an ASIC, an FPGA, and/or other hardware device suitable for retrieval and/or execution of instructions from the machine readable medium 604 to perform functions related to various examples. Additionally or alternatively, the processing resource 602 may include electronic circuitry for performing the functionality of the instructions described herein.

The machine readable medium 604 may be any medium suitable for storing executable instructions, such as RAM, ROM, EEPROM, flash memory, a hard disk drive, an optical disc, or the like. In some example implementations, the machine readable medium 604 may be a tangible, non-transitory medium, where the term "non-transitory" does not encompass transitory propagating signals. The machine readable medium 604 may be disposed within the storage system 600, as shown in FIG. 6, in which case the executable instructions may be deemed "installed" or "embedded" on the storage system 600. Alternatively, the machine readable medium 604 may be a portable (e.g., external) storage medium, and may be part of an "installation package."

As described further herein below, the machine readable medium 604 may be encoded with a set of executable instructions 606, 608, 610, 612. It should be understood that part or all of the executable instructions and/or electronic circuits included within one box may, in alternate implementations, be included in a different box shown in the figures or in a different box not shown.

Instructions 606, when executed by the processing resource 602, encode a storage device state based on status data collected from a storage device in communication with the storage system 600. Instructions 608, when executed by the processing resource 602, implement a first failure policy on the storage device based on the storage device state. The first failure policy may be derived by offline supervised machine learning using historical data of storage device states for known storage device failures. For example the first failure policy may be similar in many respects to the static failure policy 112 of FIG. 1. Implementing the first failure policy may include looking up an action to perform based on a current storage device state.

Instructions 610, when executed by the processing resource 602, choose an action based on the storage device state (encoded by instructions 606) and a second failure policy. The second failure policy containing state-action pairs that prescribe, based on a probabilistic model, whether for a particular storage device state a corresponding action is to initiate a failure mitigation procedure on the storage device or to take no action. For example, the second failure policy may be similar in many respects to the active-learning failure policy 136 of FIG. 1. In some implementations, the second failure policy may initially be set equal to the first failure policy.

Instructions 612, when executed by the processing resource 602, adjust via a reinforcement learning process the second failure policy based on a reward resulting from a previously chosen action. A magnitude of the reward may be a function of timeliness of the previously chosen action in relation to a subsequent failure of the storage device. For example, in some implementations, the magnitude of the reward is a maximum positive if the previously chosen action is the failure mitigation procedure and the storage device fails at a predetermined time period thereafter.

In view of the foregoing description, it can be appreciated that a failure policy, or in other words a policy to anticipate and mitigate imminent failure of a storage device, may undergo optimization by a system implementing an unsupervised machine learning technique. In particular, the policy may be tuned or optimized by virtue of data sets spanning a plurality of storage devices and over periods of time.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
 a storage device interface to collect status data from a storage device;
 a processor; and
 a policy learning agent comprising machine-readable instructions executable on the processor to:
  encode the collected status data into storage device states, and
  apply a reinforcement learning process to train an active-learning failure policy on the storage device states, the active-learning failure policy containing state-action pairs, each state-action pair of the state-action pairs based on a probability of choosing an action from a set of actions for a given storage device state of the storage device states, the set of actions including an action to initiate a failure mitigation procedure on the storage device or no action,
 wherein the reinforcement learning process is to:
  monitor what actions the active-learning failure policy chooses in response to the storage device states, and
  reward, based on determining a reward value using a reward function, the active-learning failure policy according to a timeliness of choosing to initiate the failure mitigation procedure relative to a failure of the storage device, wherein the reward function is to set the reward value based on a time point at which the failure mitigation procedure was initiated relative to a specified time point that is a predetermined time prior to a failure time point corresponding to the failure of the storage device.

2. The system of claim 1, wherein the policy learning agent is to initialize the active-learning failure policy by initially setting the active-learning failure policy as a copy of a static failure policy derived by supervised machine learning using historical data of storage device states for known storage device failures.

3. The system of claim 2, further comprising a policy enforcer to receive the static failure policy from an external server, and to implement the static failure policy on the storage device, based on storage device states encoded from the collected status data,
 wherein the policy enforcer is to implement the static failure policy and the policy learning agent is to apply the reinforcement learning process to train the active-learning failure policy in parallel.

4. The system of claim 2, wherein the processor is to:
 send, from the system to a further system in which the supervised machine learning is applied, data that includes output values generated by the reinforcement learning process;
 receive, at the system from the further system, an updated static failure policy updated based on the supervised machine learning applied at the further system responsive to the output values generated by the reinforcement learning process; and
 implement the updated static failure policy on the storage device, based on storage device states encoded from further status data from the storage device.

5. The system of claim 4, wherein the training of the active-learning failure policy by the reinforcement learning process produces an adjusted active-learning failure policy, and wherein the processor is to:
 send the data that includes the output values generated by the reinforcement learning process from the system to the further system in response to detecting a divergence between the adjusted active-learning failure policy and the static failure policy.

6. The system of claim 1, wherein the reinforcement learning process is to utilize SARSA($\lambda$).

7. The system of claim 1, wherein the status data includes a SCSI mode page or a Key Code Qualifier.

8. The system of claim 1, wherein the reinforcement learning process is to reward the active-learning failure policy with a maximum reward for choosing to initiate the failure mitigation procedure on the storage device at the specified time point that is the predetermined time prior to the failure of the storage device,
 and the reinforcement learning process is to reward the active-learning failure policy with a punishment for choosing to initiate the failure mitigation procedure on the storage device after the specified time point.

9. The system of claim 1, wherein the failure of the storage device includes the storage device reporting a Self-Monitoring, Analysis and Reporting Technology (SMART) trip, and the predetermined time is at least a time duration to perform the failure mitigation procedure.

10. The system of claim 1, wherein the reward function is to:
 set a maximum reward value in response to initiating the failure mitigation procedure at the specified time point, set a lower reward value in response to initiating the failure mitigation procedure at an earlier time point prior to the specified time point, wherein the lower reward value is inversely proportional to a time difference between the earlier time point and the specified time point, and set a negative reward value in response to initiating the failure mitigation procedure after the specified time point.

11. The system of claim 1, wherein the collected status data comprises read error information, write error information, and command timeout information, and wherein the policy learning agent is executable on the processor to:

encode the collected status data comprising the read error information, the write error information, and the command timeout information at a time point into a single storage device state.

12. A method for learning a failure policy by a storage system that includes a physical processing resource to implement machine readable instructions, the method comprising:

encoding a storage device state based on status data collected from a storage device coupled to the storage system;

choosing an action based on the storage device state according to an active-learning failure policy containing state-action pairs that prescribe, based on a probabilistic model, whether for a particular storage device state a corresponding action is to wait for a next storage device state or to initiate a failure mitigation procedure on the storage device; and adjusting the active-learning failure policy based on a reward resulting from a previously chosen action, a magnitude of the reward being a function of timeliness of the previously chosen action in relation to a failure of the storage device.

13. The method of claim 12, comprising:

initializing the active-learning failure policy by initially setting the active-learning failure policy as a copy of a static failure policy derived by a supervised machine learning system using historical data of storage device states for known storage device failures;

sending, from the storage system to the supervised machine learning system, call home data associated with the active-learning failure policy for comparison to the static failure policy by the supervised machine learning system;

receiving, at the storage system from the supervised machine learning system, an updated static failure policy as updated by the supervised machine learning system in response to the call home data; and implementing, at the storage system, the updated static failure policy on the storage device, based on storage device states encoded from further status data from the storage device.

14. The method of claim 13, wherein the call home data comprises output values generated by a learning process that adjusts the active-learning failure policy at the storage system.

15. The method of claim 13, wherein the sending of the call home data from the storage system to the supervised machine learning system is in response to detecting a divergence between the adjusted active-learning failure policy and the static failure policy.

16. The method of claim 12, wherein the reward comprises a reward value generated by a reward function based on a time point at which the failure mitigation procedure was initiated relative to a specified time point that is a predetermined time prior to a failure time point corresponding to the failure of the storage device.

17. The method of claim 16, wherein the reward function:

sets a maximum reward value in response to initiating the failure mitigation procedure at the specified time point, sets a lower reward value in response to initiating the failure mitigation procedure at an earlier time point prior to the specified time point, wherein the lower reward value is inversely proportional to a time difference between the earlier time point and the specified time point, and sets a negative reward value in response to initiating the failure mitigation procedure after the specified time point.

18. A non-transitory machine readable medium comprising instructions that upon execution by a processing resource of a storage system cause the storage system to:

encode a storage device state based on status data collected from a storage device in communication with the storage system;

implement a first failure policy on the storage device based on the storage device state, the first failure policy derived by offline supervised machine learning using historical data of storage device states for known storage device failures;

choose an action based on the storage device state and a second failure policy comprising state-action pairs that prescribe, based on a probabilistic model, whether for a particular storage device state a corresponding action is to initiate a failure mitigation procedure on the storage device or to take no action; and adjust, using a reinforcement learning process, the second failure policy based on a reward resulting from a previously chosen action, a magnitude of the reward being a function of timeliness of the previously chosen action in relation to a failure of the storage device.

19. The non-transitory machine readable medium of claim 18, wherein the reward comprises a reward value generated by a reward function based on a time point at which the failure mitigation procedure was initiated relative to a specified time point that is a predetermined time prior to a failure time point corresponding to the failure of the storage device.

20. The non-transitory machine readable medium of claim 19, wherein the reward function is to:

set a maximum reward value in response to initiating the failure mitigation procedure at the specified time point, set a lower reward value in response to initiating the failure mitigation procedure at an earlier time point prior to the specified time point, wherein the lower reward value is inversely proportional to a time difference between the earlier time point and the specified time point, and set a negative reward value in response to initiating the failure mitigation procedure after the specified time point.

* * * * *